Jan. 24, 1928.
K. EHRGOTT
1,657,205
ELECTRIC BAKE OVEN
Filed Nov. 12, 1925
3 Sheets-Sheet 2
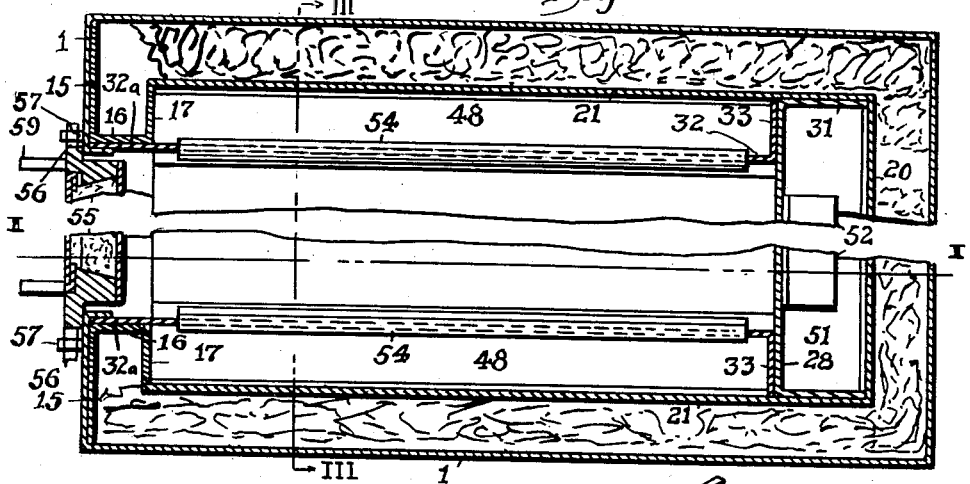
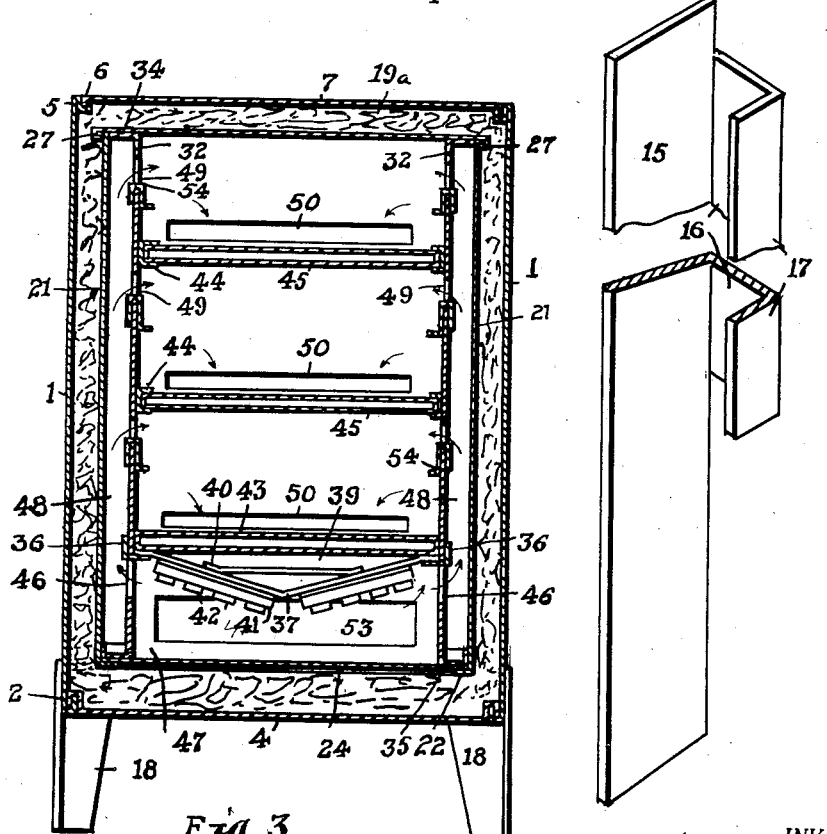
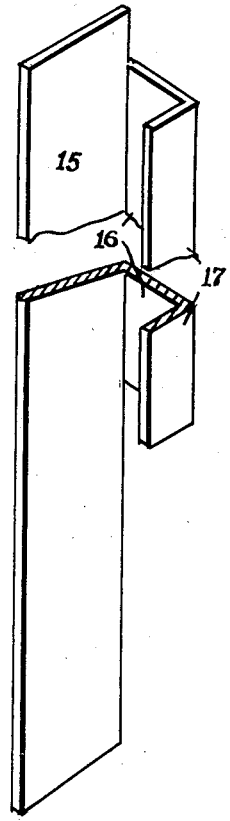
INVENTOR.
Karl Ehrgott,
BY Edward A. Laurena
his ATTORNEY.

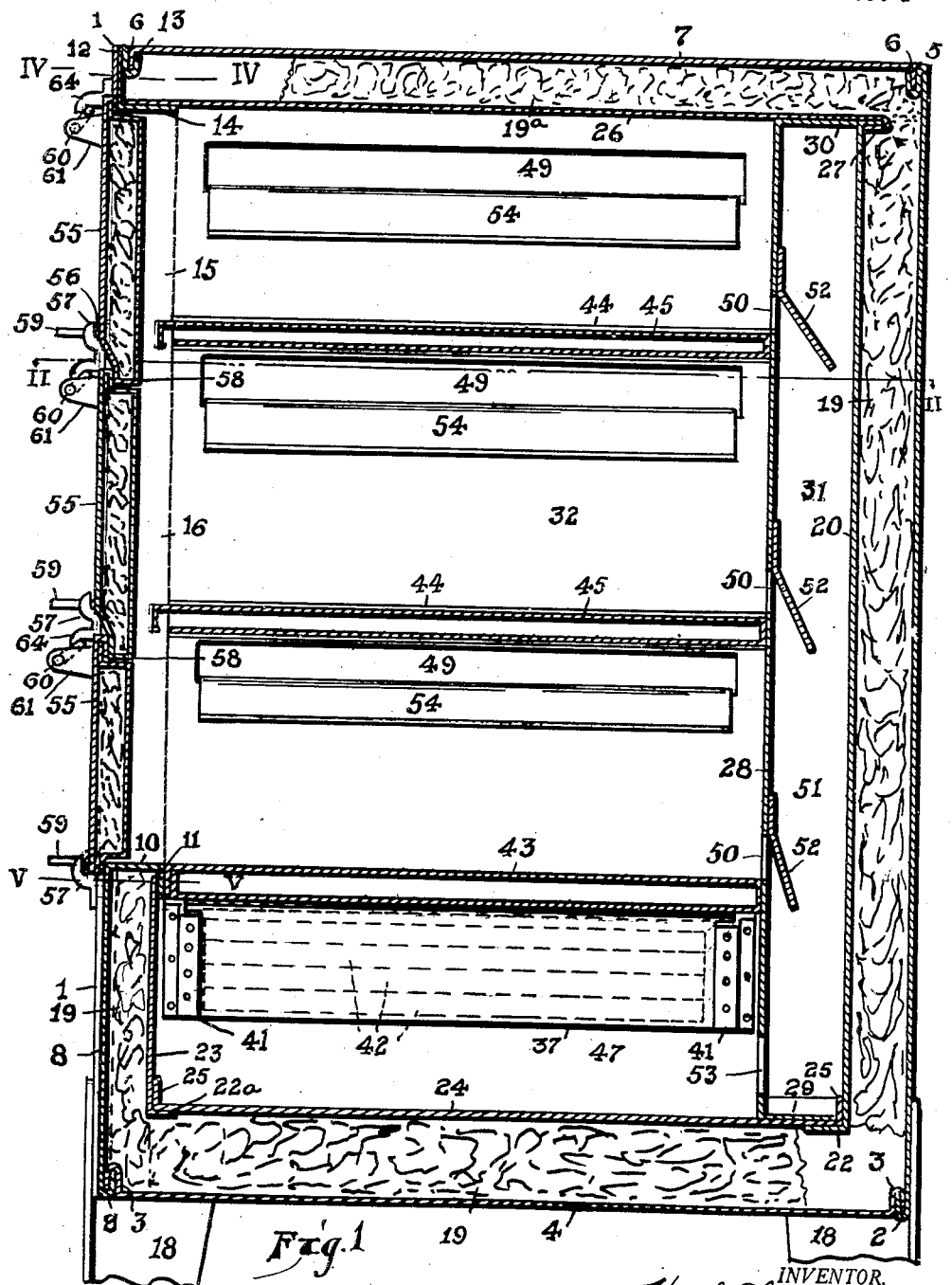

Jan. 24, 1928.
K. EHRGOTT
1,657,205
ELECTRIC BAKE OVEN
Filed Nov. 12, 1925
3 Sheets-Sheet 3
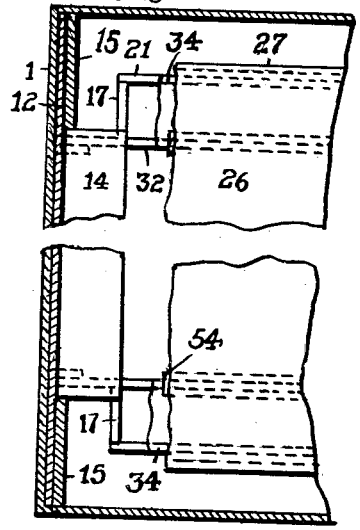
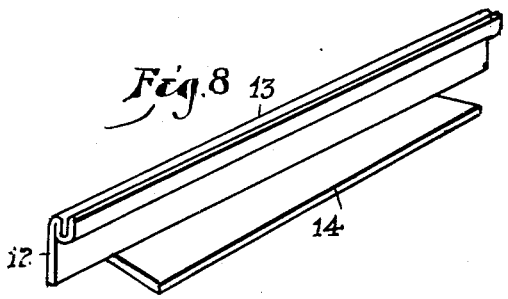
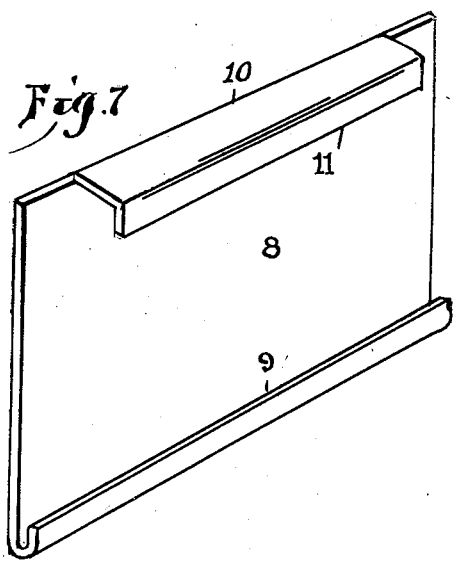
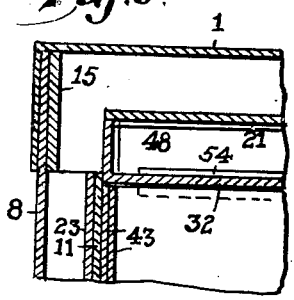
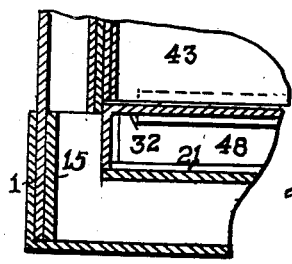
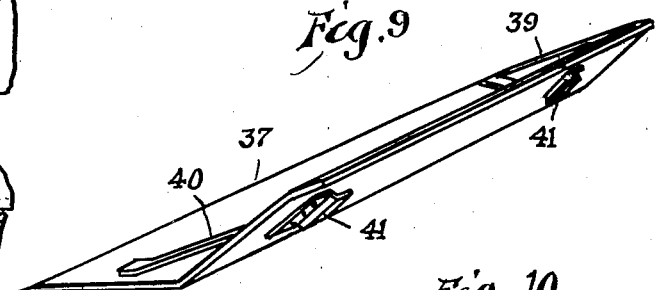
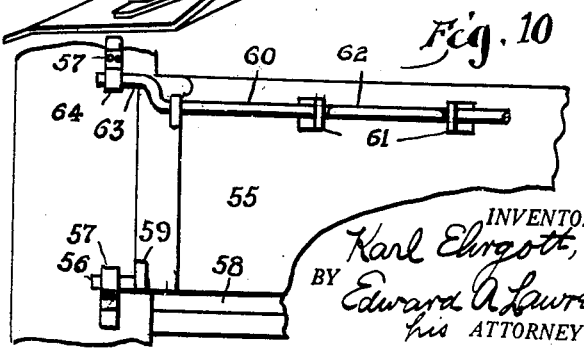
INVENTOR.
Karl Ehrgott,
BY Edward A. Lawrence
his ATTORNEY Patented Jan. 24, 1928.

1,657,205

UNITED STATES PATENT OFFICE.

KARL EHRGOTT, OF ERIE, PENNSYLVANIA, ASSIGNOR TO BERNARD GLOEKLER COMPANY, OF PITTSBURGH, PENNSYLVANIA, A CORPORATION OF PENNSYLVANIA.

ELECTRIC BAKE OVEN.

Application filed November 12, 1925. Serial No. 68,524.

The object which I have in view is the provision of an electric bake oven which is relatively inexpensive and compact, which will utilize the heat efficiently and economically, which will be reliable and durable, and which may be readily repaired when necessary.

In general my improved electric oven is characterized by an outer enclosure provided with walls insulated against the escape and waste of the internal heat of the oven.

The baking compartment or compartments are located above the heating compartment in which the electrical heating elements are mounted, wall flues being provided whereby the hot air from the heating compartment is introduced into each baking compartment and the used air is led from the baking compartment back to the heating compartment for reheating.

I show new and improved means for mounting the heating elements in position and for baffling or directing the heated air therefrom into the hot air flues.

I also show new and improved features of oven construction.

Other novel features of construction, and also arrangement of parts will appear from the following description.

In the accompanying drawings wherein I illustrate the best embodiment of the principles of my invention now known to me, Fig. 1 is a longitudinal vertical section of the oven taken along the line I—I in Fig. 2; Fig. 2 is a broken horizontal section taken along the line II—II in Fig. 1; Fig. 3 is a transverse vertical section taken along the line III—III in Fig. 2; Fig. 4 is a broken horizontal section taken along the line IV—IV in Fig. 1; Fig. 5 is a similar section taken along the lines V—V in Fig. 1; Fig. 6 is a broken perspective of one of the front vertical reinforcement members; Fig. 7 is a perspective of the front panel member; Fig. 8 is a perspective of the top reinforcing member; Fig. 9 is a perspective of the heating unit support and baffle; Fig. 10 is a broken front elevation showing the means for hinging and for locking the doors, and Fig. 11 is an enlarged perspective of one of the combined hinge-supports and catches.

The construction of the oven as shown in the drawings is substantially as follows.

1 represents the outer casing which may be of sheet metal and forms the side walls, the rear wall and the front walls, all of which may be formed integrally of the single sheet. At the front the vertical edges of the sheet do not meet but are spaced apart the width of the doorway.

The bottom edge of the side and rear walls of the casing are turned up inwardly to form a hooked flange 2 into which fits the hook flange 3 which edges the bottom sheet 4. At the top the side and rear walls are likewise provided with a hook flange 5 to receive the downwardly turned perimetral flange 6 of the cover sheet 7.

The front of the oven is provided with the bottom panel 8 which bears outwardly against the front walls of the casing 1 for the full width thereof and has its bottom edge provided with the upturned hook flange 9 engaged by the reverse hook flange 3 at the front of the bottom sheet 4. The central top of the bottom panel 8 is provided with an inwardly extending horizontal portion 10 which forms the lintel plate of the doorway, and the inner edge of the lintel plate 10 is provided with a downturned vertical flange 11.

12 is a horizontal reinforcing plate which fits from within against the front casing walls 1 at their top and is provided at its top edge with a hook flange 13 which is engaged by the front flange 6 of the cover sheet 7. At its center the plate 12 is provided at its bottom edge with an inwardly extending horizontal portion 14 which forms the top plate of the doorway.

15 represents a pair of vertically disposed reinforcing members for the front of the oven fitting flat against the inner side of the bottom panel 8 and extending up inside of the casing walls 1 and against the inner side of the top plate 12. The members 15 are short enough so as not to interfere with the hook flanges 9 and 13. Between the lintel plate 10 and the top plate 12 of the doorway the members 15 are provided with inwardly extending vertical portions 16 which form the side walls of the doorway, and the inner ends of the portions 16 are provided with rearwardly turned flanges 17. The members 15, the bottom panel 8 and the top bar 12 may be secured together in any convenient manner, for instance as by riveting. The casing is supported by the angle legs 18 which are attached to the casing at the corner as by riveting.

19 represents plates or mats of heat-insulating material such as asbestos felt, which line the bottom and vertical walls of the outer casing.

20 represents the rear wall of the inner casing and 21 the side walls of the same, all of which may be integrally formed by bending up a sheet of metal. At the front the side walls 21 extend forwardly and bear against the vertical edges of the flange 17 of the reinforcing members 15 as shown in Fig. 2. The bottom edges of the rear wall 20 and the side walls 21 are flanged inwardly as shown at 22 and rest on the bottom insulating mat 19, the walls also bearing from within against the vertical insulating mats 19 of the rear and side walls of the casing.

23 is a front wall plate which bears at its top inwardly against the flange 11 of the front panel 8 and has its bottom provided with an inwardly extending flange 22$^a$. 24 is the floor plate resting on the bottom insulating mat 19 and on the flanges 22 and 22$^a$, the edges of the floor plate 24 being flanged upwardly as shown at 25 to bear outwardly against the walls 20, 21 and 23. The tops of the walls 20 and 21 stop at the level of the top plate 12 of the doorway.

26 is a ceiling plate resting on said top plate 12 and on the tops of the walls 20 and 21, said walls being flanged outwardly at their tops and the plate 26 being clinched over the same as shown at 27. 19$^a$ is an insulating mat interposed between the ceiling plate 26 and the cover sheet 7.

It thus appears that the outer inclosure of the oven is provided with inner and outer walls having an interlining of insulating material to conserve the heat.

28 is the rear baffle plate vertically disposed and spaced inwardly from the rear wall 20. Said plate is held in spaced relation with said rear wall 20 in the following manner. 29 represents a bottom flange on the plate 28 which rests on the floor plate 24 and bears at its outer edge against the flange 25 of said floor plate. At its top the baffle plate 28 is provided with a horizontal flange 30 which bears upwardly against the ceiling plate 26 and at its outer edge against the rear wall 20. The vertical edges of the baffle plate are provided with rearwardly extending flanges 31 which bear against the side walls 21 and at their rear edges against the rear wall 20.

The baffle wall 28 forms the rear wall of the oven compartment. The side walls of the oven compartment are formed of the sheet metal walls 32 whose vertical rear edges are provided with outwardly extending flanges 33 which bear against the baffle wall 28 and at their ends against the side walls 21. At their tops the walls 32 are provided with outwardly turned flanges 34 which bear against the ceiling plate 26 and against the side walls 21. At their bottoms the walls 32 are provided with outturned flanges 35 which bear against the floor plate 24 and at their ends against the flanges 25.

At either side of the doorway the inner side walls 32 are extended forwardly as shown at 32$^a$ in Fig. 2 bearing against the portions 16 of the front reinforcements 15, and the walls of the outer casing 1 are bent inwardly against the portions 32 as shown at 1$^a$ in Fig. 2.

Slightly below the bottom of the front doorway the inner side walls 32 are horizontally slotted for the insertion in place of the angle bars 36 whose vertical flanges bear against the outer side of the walls 32 and whose horizontal flanges extend into the oven chamber to form supports.

37 is a metal plate bent into flat V-shape but with horizontal edges 38 which support the plate 37 in position by resting on the horizontal flanges of the angle bars 36. At the rear the support 37 is stiffened by a triangular end plate 39 and at the front by a brace bar 40. The plate 37 forms the support for the electric heating units and also acts as a baffle to direct the currents of hot air.

41 represents Z-bars which are attached to the under surface of the support 37 near its front and rear ends to receive the electrical heating units 42 to support them in place.

43 is a removable shelf which may conveniently be of shallow box form as shown in Fig. 3 and which is held in place by resting on the horizontal edges 38 of the support 37. The shelf 43 forms the bottom of the lower cooking compartment of the oven.

44 represents channel iron guides horizontally disposed and mounted in pairs on the inner faces of the walls 32 to form supports into which the shelves 45 may be slid through the doorway. In the illustration shown the oven is divided into three cooking compartments by these shelves, but it will be understood that any number of shelves dictated by the size and desired capacity of the oven may be provided.

Just below the mounting of the angle bars 36 the inner side walls 32 are provided with open ports 46 extending for substantially the full depth of the oven and admitting the heated air from the heating compartment 47 below the support 37 into the side flues 48 formed by the space between the walls 21 and the walls 32. A slight distance below each of the shelves 45 the walls 32 are provided with horizontally extending ports 49, thus admitting the heated air from the flues 48 into contact with the under side of the shelf.

Slightly above each of the shelves the rear baffle wall 28 is provided with horizontally elongated ports 50 by means of which the air, after it has delivered its effective heat to the shelf 45 above, enters the downward return flue 51 formed between the rear wall 20 and the baffle wall 28.

Each of the escape ports 50 is provided at its rear with a deflector 52 to assist in directing the currents of air downwardly in the return flue 51.

Near its bottom the baffle wall 28 is provided with an open flue 53 by means of which the used air is admitted to the bottom of the heating chamber 47.

Each of the ports 49 in the walls 32 is provided with a regulating gate or closure 54, which is shown formed by bending a piece of sheet metal so that it is extended through the port and clamped against the wall 32 from either side. This provides sufficient friction between the gate and the wall so that the gate 54 will hold its raised or lowered position to either open the ports 49 widely, close it entirely, or close it partially to the degree desired.

55 represents the doors which together close the doorway. Said doors are preferably interlined with insulating material such as asbestos felt and are provided at their bottom edges with horizontal and outwardly extending trunnions 56 which rest in trough bearings 57 secured to the front of the oven at either side of the doorway. Thus the doors may be moved from their position when desired.

All of the doors except the lower door are provided with inwardly and downwardly extending flange portions 58, which when said doors are closed bear inwardly against the door just below to complete the closure.

59 represents arms rigid with the trunnions 56 and extending forwardly in a horizontal position when the doors are closed but when the doors are open swinging down and bearing against the front of the oven to limit the open position of the doors to the horizontal and support them when they are open.

The doors are provided with individual means for latching them in their closed positions. Thus I have shown a horizontally disposed bar 60 journaled in front of each door in brackets 61 extending from the latter. The intermediate portion of the bar is provided with a handle for grasping which may be conveniently a forwardly extending crank portion 62. The ends of the bar 60 are off set or cranked rearwardly as at 63, so that when the handle 62 is pushed downwardly toward the horizontal the ends 63 will engage under the catches 64 on the front of the oven at either side of the doorway. By raising the handle, the ends of the bar are disengaged from the catches and the door unlatched.

I prefer to make the trough-bearings 57 and the catches 64 as integral elements, the bearing for the upper door being above and the catches for the lower door being below, as clearly illustrated in Figs. 10 and 11.

It is evident from the foregoing that the air heated by passing in contact with the electrical heating elements 42 is directed by the inclinations of the support 37 out through the ports 46 into the side wall flues 48 from when it passes through the ports 49 into the baking compartments; the gates 54 providing means whereby the intensity of heat in any one or more of the baking compartments may be properly regulated. The air escapes from the baking compartments through the ports 50 into the return flue 51, flowing downwardly therein and out through the bottom port 53 and back into the heating chamber into contact with the electrical heating elements.

I thus obtain a constant circulation of the air without material escape thereof to without the oven or admission of cold air from without. I thereby conserve and utilize the heat produced by the electrical heating units to the utmost practical extent, and the flavors and juices released by cooking are retained rather than dissipated.

The construction of my improved oven is relatively inexpensive but substantial, and any repairs which may be needed may be readily made, parts replaced, &c.

The individual doors of the baking compartments permit the insertion into or removal from any one compartment of food without disturbing the other compartment.

The shelves may be removed through the front doorway, and by first removing the bottom shelf and disconnecting the electrical connection of the heating units, the units and their support may be lifted bodily from the oven.

By first removing the doors, it is possible to remove one or more of the shelves, thus increasing the capacity of a cooking compartment to accommodate articles of food requiring more oven space than is afforded by the arrangement of shelves illustrated in the drawings. When the doors are replaced an air-tight front closure is provided.

It will be noted that the tendency of the hotter air currents to rise and that of the cooler currents to descend are taken advantage of by positioning the ports 46 and 49 leading into and from the heating compartment and the baking compartments, respectively, in the upper portion of said compartments while the escape ports 50 are near the bottoms of the baking chamber and the port 53 is near the bottom of the heating compartment.

What I desire to claim is:—

1. In an electric bake oven, the combination of a heating compartment, a baking compartment above said heating compartment, a pair of opposite flues connecting the upper portions of said compartments to conduct the heated air to the baking compartment, a return flue connecting the lower portions of said compartments, electric heating elements in said heating compartment, and means for directing the air from said electric heating elements into the first mentioned flues.

2. In an electric bake oven, the combination of a heating compartment, electric heating elements mounted in said heating compartment, a plurality of baking compartments superimposed on said heating compartment, a vertical flue having communication with the upper portions of said compartments to conduct heated air from the heating compartment to the baking compartments, and a return flue for the air communicating with the lower portions of the compartments.

3. In an electric bake oven, the combination of a heating compartment, electric heating elements mounted in said heating compartment, a plurality of baking compartments superimposed on said heating compartment, a vertical flue having communication with the upper portions of said compartments to conduct heated air from the heating compartment to the baking compartments, a return flue for the air communicating with the lower portions of the compartments, and means for directing the heated air from said electric heating elements to said first named flue.

4. In an electric bake oven, the combination of a heating compartment, electrical heating elements in said compartment, a plurality of baking compartments superimposed on said heating compartment, vertical side wall flues having communication with the upper portions of all said compartments to deliver heated air from said heating compartment to said baking compartments, and a return flue having communication with the lower portions of all of said compartments.

5. In an electric bake oven, the combination of a heating compartment, electrical heating elements in said compartment, a plurality of baking compartments superimposed on said heating compartment, vertical side wall flues having communication with the upper portions of all said compartments to deliver heated air from said heating compartment to said baking compartments, a return flue having communication with the lower portions of all of said compartments, and means for directing the air from the electric heating elements to the first mentioned flues.

6. In an electric bake oven, the combination of a heating compartment having air escape ports in its opposite walls, a V-shaped support depending past said ports and within said compartment, heating elements attached to the underside of the inclined surfaces of said support, and an air admission port below said first mentioned ports, said support acting as a baffle to direct the heated air into the first mentioned ports.

7. In an electric bake oven, the combination of an inner enclosure divided by a plurality of horizontal shelves into a plurailty of baking compartments, an outer enclosure having its vertical walls spaced from the walls of the inner enclosure to form vertical flues at the sides and at the rear of the inner enclosure, ports connecting the side flues to the top portion of each of the baking compartments, ports connecting the rear flue with the bottoms of each of said baking compartments, and a heating compartment beneath said inner enclosure and to which the lower ends of said flues are connected.

8. In an electric bake oven, the combination of an inner enclosure divided by a plurality of horizontal shelves into a plurality of baking compartments, an outer enclosure having its vertical walls spaced from the walls of the inner enclosure to form vertical flues at the sides and at the rear of the inner enclosure, ports connecting the side flues to the top portion of each of the baking compartments, ports connecting the rear flue with the bottoms of each of said baking compartments, a heating compartment beneath said inner enclosure and to which the lower ends of said flues are connected, and an electrical heating element in said heating compartment.

9. In an electric bake oven, the combination of a heating compartment, a baking compartment superimposed on said heating compartment, vertical flues leading upwardly from said heating compartment and disposed at the sides of said baking compartment, said flues communicating with the interior of the baking compartment, a return flue at the rear of the baking compartment and communicating therewith, the lower end of said return flue communicating with the heating compartment, and an electrical heating element in said heating compartment and disposed to direct the currents of hot air into said side flues.

10. In an electric bake oven, the combination of a heating compartment, a baking compartment superimposed on said heating compartment, vertical flues leading upwardly from said heating compartment and disposed at the sides of said baking compartment, said flues communicating with the interior of the baking compartment, a return flue at the rear of the baking compartment and communicating therewith, the lower end of said return flue communicating with the heating compartment, and an electrical heating element in said heating compartment, said element being mounted so as to incline upwardly toward the mouths of said side flues to direct the currents of hot air thereinto.

11. In an electric bake oven, the combination of a heating compartment, a baking compartment superimposed on said heating compartment, vertical flues leading upwardly from said heating compartment and disposed at the sides of said baking compartment, said flues communicating with the interior of the baking compartment, a return flue at the rear of the baking compartment and communicating therewith, the lower end of said return flue communicating with the heating compartment, and an electrical heating element mounted in said heating compartment and arranged in a V-shape between the mouths of said side flues to direct the currents of hot air into the mouths of said side flues.

Signed at Pittsburgh, Pa., this 10th day of November, 1925.

KARL EHRGOTT.